United States Patent
Ha et al.

(10) Patent No.: US 9,684,991 B2
(45) Date of Patent: Jun. 20, 2017

(54) IMAGE PROCESSING APPARATUS AND METHOD USING PHOTON MAPPING AND RAY TRACING AND INCREASING A RATE OF PHOTON MAPPING

(71) Applicants: SAMSUNG ELECTRONICS CO., LTD., Suwon-si (KR); Aarhus Universitet, Aarhus (DK)

(72) Inventors: In Woo Ha, Yongin-si (KR); Yong Beom Lee, Seoul (KR); Jacob Toft Pedersen, Aarhus (DK); Toshiya Hachisuka, Aarhus (DK); Do Kyoon Kim, Seongnam-si (KR); Min Su Ahn, Seoul (KR); Hyong Euk Lee, Suwon-si (KR)

(73) Assignees: Samsung Electronics Co., Ltd., Suwon-si (KR); Aarhus Universitet, Aarhus (DK)

( * ) Notice: Subject to any disclaimer, the term of this patent is extended or adjusted under 35 U.S.C. 154(b) by 256 days.

(21) Appl. No.: 14/269,766

(22) Filed: May 5, 2014

(65) Prior Publication Data

US 2014/0333624 A1    Nov. 13, 2014

(30) Foreign Application Priority Data

May 8, 2013  (KR) .................... 10-2013-0052072

(51) Int. Cl.
*G06T 15/06* (2011.01)
*G06T 15/50* (2011.01)

(52) U.S. Cl.
CPC ............ *G06T 15/06* (2013.01); *G06T 15/506* (2013.01)

(58) Field of Classification Search
USPC .................................................. 345/426, 421
See application file for complete search history.

(56) References Cited

U.S. PATENT DOCUMENTS

| | | | |
|---|---|---|---|
| 5,239,624 A | 8/1993 | Cook et al. | |
| 7,952,583 B2 | 5/2011 | Waechter et al. | |
| 8,085,267 B2 | 12/2011 | Brown et al. | |
| 2012/0075303 A1* | 3/2012 | Johnsson | G06T 15/06 345/421 |
| 2013/0002672 A1 | 1/2013 | Peterson et al. | |
| 2013/0016109 A1 | 1/2013 | Garanzha | |
| 2013/0050213 A1 | 2/2013 | McCombe et al. | |

FOREIGN PATENT DOCUMENTS

| | | |
|---|---|---|
| KR | 10-0521413 | 10/2005 |
| KR | 10-0834157 | 5/2008 |
| KR | 10-1031392 | 4/2011 |

OTHER PUBLICATIONS

Atalay et al.; Interpolation Over Light Fields with Application in Computer Graphics; ALENEX, pp. 56-68; 2003.*

(Continued)

*Primary Examiner* — Kimbinh T Nguyen
(74) *Attorney, Agent, or Firm* — NSIP Law (57) ABSTRACT

Provided is an image processing apparatus for performing photon mapping, and the image processing apparatus may perform ray tracing for photon mapping, sample a ray space based on a result of the ray tracing, and perform pseudo photon mapping using the sampled ray space.

20 Claims, 9 Drawing Sheets

(56) References Cited

OTHER PUBLICATIONS

Waters; Photon Mapping; https://web.archive.org/web/20060902050340/http://web.cs.wpi.edu/~emmanuel/courses/cs563/write_ups/zackw/photon_mapping/PhotonMapping.html; retrieved by the Internet Archive on Sep. 2, 2006.*
Steinberger et al.; Ray Prioritization Using Stylization and Visual Saliency; Computers and Graphics 36; pp. 673-684; Mar. 2012.*
Chen et al.; Improved Stochastic Progressive Photon Mapping with Metropolis Sampling; Eurographics Symposium on Rendering 2011, vol. 30, No. 4, 2011.*

* cited by examiner

FIG. 8

IMAGE PROCESSING APPARATUS AND METHOD USING PHOTON MAPPING AND RAY TRACING AND INCREASING A RATE OF PHOTON MAPPING

CROSS-REFERENCE TO RELATED APPLICATIONS

This application claims the priority benefit of Korean Patent Application No. 10-2013-0052072, filed on May 8, 2013, in the Korean Intellectual Property Office, the disclosure of which is incorporated herein by reference.

BACKGROUND

1. Field

One or more example embodiments relate to an image processing apparatus, and more particularly, to an image processing apparatus using photon mapping.

2. Description of the Related Art

Technologies relating to three-dimensional (3D) image rendering include rasterization, ray tracing, radiosity, photon mapping, and the like.

Photon mapping refers to a photorealistic rendering algorithm enabling various effects such as specular, diffuse interreflection, subsurface scattering, caustics, indirect illumination, and the like.

However, in order to calculate photons to be used for photon mapping, calculation of a number of photons associated with a large number of rays from a light source may be required and thus, real-time processing of rendering may be difficult.

In order to enable real-time processing of rendering in photon mapping, an increase in performance of operational resources may be required. However, such an increase in performance of operational resources may be limited and inefficient.

SUMMARY

The foregoing and/or other aspects are achieved by providing an image processing apparatus including a ray tracer to perform ray tracing with respect to a plurality of first rays for photon mapping, a sampling unit to sample a ray space using the plurality of first rays, and a reconstructor to reconstruct the sampled ray space to provide at least one second ray for generating a pseudo photon.

The apparatus may further include a ray selector to select the plurality of first rays based on at least one of a texture of a three-dimensional (3D) object associated with the photon mapping, a direction, a position, and an intensity of lighting associated with the photon mapping.

The ray selector may select the plurality of first rays using stochastic probability photon scattering.

The apparatus may further include a photon processor to generate photons associated with the plurality of first rays.

The apparatus may further include a pseudo photon processor to generate at least one pseudo photon using the at least one second ray.

The apparatus may further include a renderer to render at least one point using at least one first pseudo photon associated with the at least one point corresponding to a rendering point of view, among the at least one pseudo photon.

The apparatus may further include a radiance estimator to estimate a radiance of the at least one point using the at least one first pseudo photon.

The sampling unit may sample the ray space using a photon function determined by arranging directions and positions of the plurality of first rays three-dimensionally.

The reconstructor may provide the at least one second ray by interpolating the plurality of first rays using the photon function.

The foregoing and/or other aspects are achieved by providing an image processing method including performing ray tracing with respect to a plurality of first rays for photon mapping, sampling a ray space using the plurality of first rays, and reconstructing the sampled ray space to provide at least one second ray for generating a pseudo photon.

The method may further include selecting the plurality of first rays using stochastic probability photon scattering based on at least one of a texture of a 3D object associated with the photon mapping, a direction, a position, and an intensity of lighting associated with the photon mapping.

The method may further include generating photons associated with the plurality of first rays, and generating at least one pseudo photon using the at least one second ray.

The method may further include rendering at least one point using photons associated with the at least one point corresponding to a rendering point of view, among the photons associated with the plurality of first rays and the at least one pseudo photon.

The method may further include estimating a radiance of the at least one point using the photons associated with the at least one point.

The sampling may include sampling the ray space using a photon function determined by arranging directions and positions of the plurality of first rays three-dimensionally.

The reconstructing may include providing the at least one second ray by interpolating the plurality of first rays using the photon function.

The foregoing and/or other aspects are achieved by providing an image processing apparatus including a processor, a ray tracer to perform ray tracing with respect to a plurality of first rays selected from among all rays to be used for photon mapping, a sampling unit to sample a ray space using the plurality of first rays traced by the ray tracer, and a reconstructor to reconstruct the sampled ray space by providing at least one second ray that is not actually traced using the plurality of first rays traced by the ray tracer.

The foregoing and/or other aspects are achieved by providing an image processing method including performing ray tracing, by way of a processor, on a first sub-quantity of rays selected from a plurality of rays to be used for photon mapping, sampling a ray space using the ray-traced first sub-quantity of rays, and reconstructing the sampled ray space by calculating a second sub-quantity of rays, without ray-tracing the second sub-quantity of rays, based on the traced first sub-quantity of rays.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
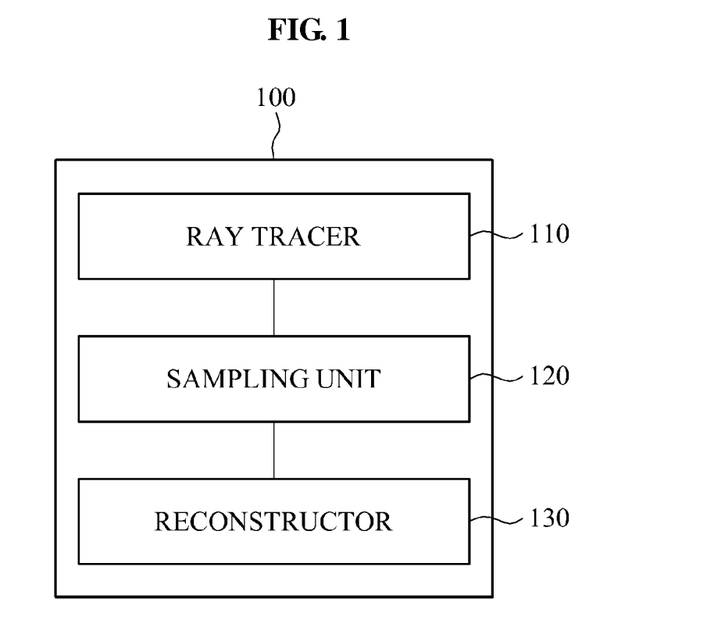
FIG. 1 illustrates an image processing apparatus according to example embodiments.

FIG. 1 illustrates an image processing apparatus 100 according to example embodiments.

The image processing apparatus 100 may perform photon mapping. Since a quantity of operations for photon mapping may be relatively large in a ray tracing process with respect to photons associated with a quantity of rays, an increase in an operational efficiency may be required for real-time processing.

A number of redundancies may exist in rays emitted from a light source considered for photon mapping and affecting a radiance of a three-dimensional (3D) object. Because of such redundancies, tracing a number of rays and calculating actual photons, similar to a conventional photon mapping process, may be inefficient.

Accordingly, the image processing apparatus 100 may trace a sub-quantity of the total quantity of rays rather than actually tracing all of the rays.

A ray tracer 110 may perform ray tracing with respect to a plurality of first rays selected from among all rays to be used for photon mapping.

Rays most affecting a quality of rendering may be selected in advance from among all of the rays, as the plurality of first rays. The selection of the rays will be described in detail with reference to FIG. 2.

A sampling unit 120 may sample a ray space using the plurality of first rays actually traced.

The term "ray space" refers to a theoretical space including ray information when all of the rays have been traced. The ray tracing process with respect to the plurality of first rays and photon information to be stored will be described in detail with reference to FIGS. 5 and 6. In addition, the ray space will be described in detail with reference to FIG. 7.

A reconstructor 130 may reconstruct the sampled ray space by providing, using a traced ray of the plurality of first rays actually traced, at least one second ray that is not actually traced. For example, in an embodiment, the reconstructor 130, may reconstruct the sampled ray space to include all rays to be used for photon mapping by combining the plurality of first rays actually traced and the at least one ray that is not actually traced.

In this process, the at least one second ray may be a ray not actually traced, but rather obtained indirectly using the plurality of first rays actually traced. Hereinafter, the second ray may be referred to as a pseudo ray.

When such a pseudo ray is processed, inaccurate photons may be provided. In order to distinguish the inaccurate photons from accurate photons, the inaccurate photons may be referred to as pseudo photons.

The image processing apparatus 100 may increase an operational efficiency, by removing redundancy in the ray tracing process during photon mapping. A detailed operation of the image processing apparatus 100 will be further described with reference to FIGS. 4 through 7.

Figure 2:
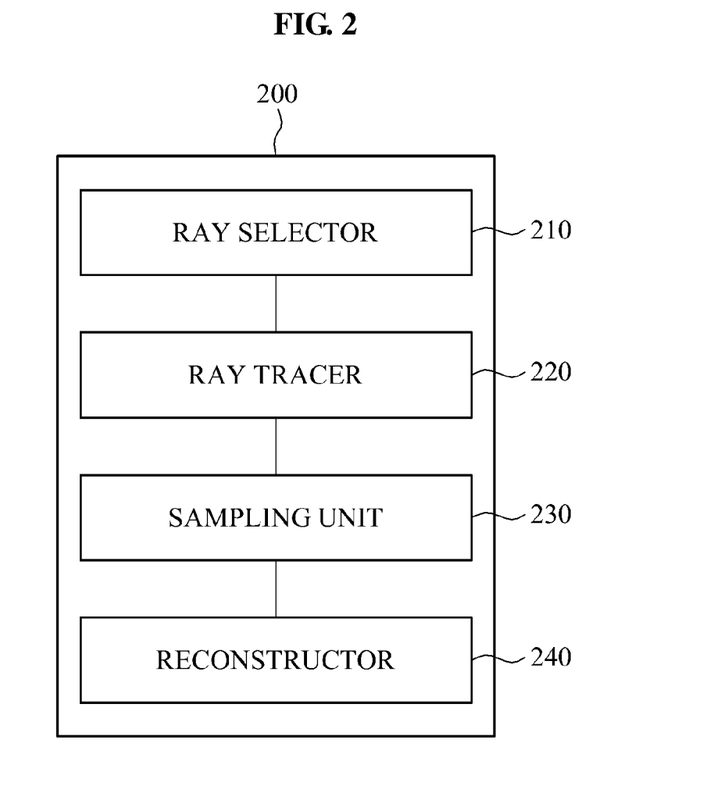
FIG. 2 illustrates an image processing apparatus according to other example embodiments.

FIG. 2 illustrates an image processing apparatus 200 according to other example embodiments.

The image processing apparatus 200 may select a plurality of first rays to be actually traced, from among all rays to be traced, in relation to photon mapping.

In this process, a texture of a 3D object, a direction, an intensity, and a position of a light source may be considered.

The texture may include a reflectance, and a color of an object associated with a predetermined ray. For example, a degree of visual recognition with respect to a difference in a quality of rendering may be relatively high on any of a surface with a high reflectance, a surface with a high texture complexity, and a surface with a bright color. Accordingly, rays associated with such portions may be considered to have a high degree of significance in the selection process.

Rays may be selected based on an intensity, and a direction of a light source providing photons, as only an example. For example, as the intensity of the light source increases and/or a sensitivity of the direction of the light source to a quality of rendering increases, a quantity of rays to be sampled may increase.

A ray selector 210 may select significant rays that may most affect rendering quality, through stochastic sampling for example, in consideration of such various factors.

When such significant rays are sampled, ray tracing or photon mapping may be performed with respect to the selected first rays, similar to a previous photon mapping process. Second rays not selected, but to be considered in rendering, may be obtained indirectly through a ray space sampled using the first rays and a photon function representing the ray space. Such non-selected second rays are referred to as pseudo rays.

Accordingly, pseudo rays and pseudo photons to be used for real-time rendering may be determined using significant accurate rays, and a radiance of an object may be estimated with a relatively smaller number of operations, in other words, with a greater operational efficiency.

Since a processing portion needing a relatively low amount of memory for processing pseudo photons may increase, a quantity of operations needed for processing a large number of photons may be reduced, which may be advantageous to real-time calculation.

When the ray selector 210 selects the plurality of first rays, a ray tracer 220 may perform ray tracing with respect to the plurality of selected first rays.

As described with reference to FIG. 1, a sampling unit 230 may sample a ray space using the plurality of first rays. The sampling process will be described in detail with reference to FIGS. 5 through 7.

In addition, a reconstructor 240 may reconstruct the sampled ray space to provide, using the sampled ray space, at least one second ray not actually traced.

Figure 3:
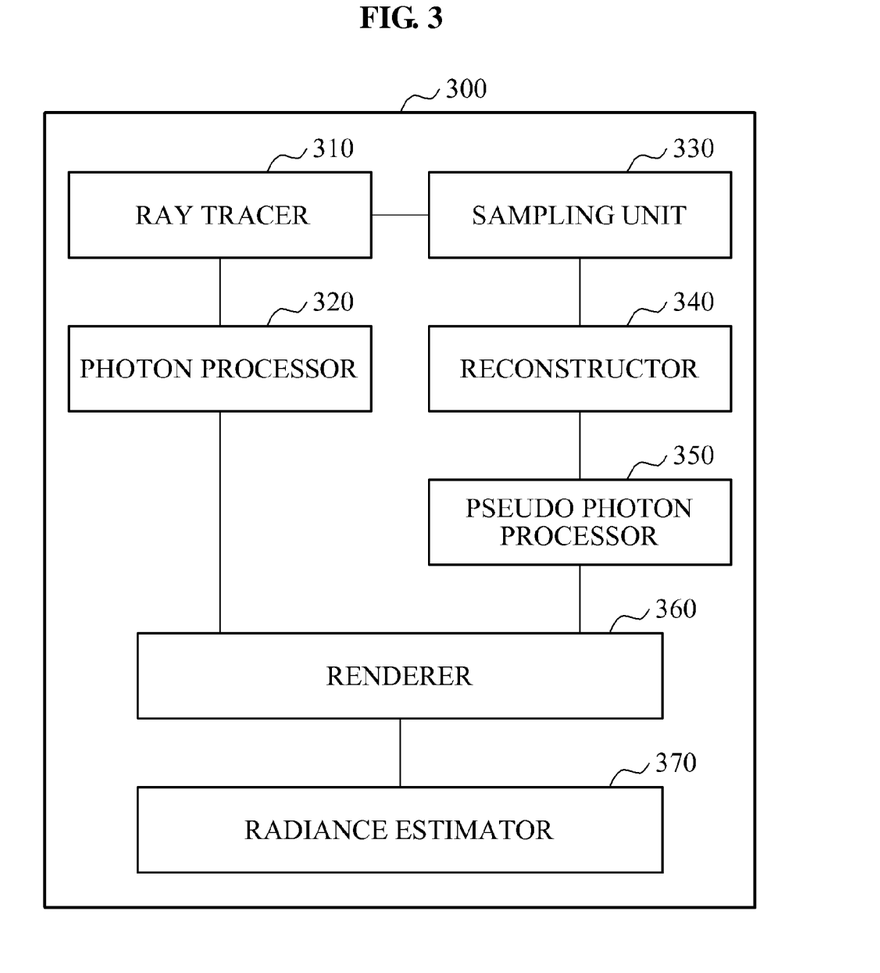
FIG. 3 illustrates an image processing apparatus according to still other example embodiments.

FIG. 3 illustrates an image processing apparatus 300 according to still other example embodiments.

Referring to FIG. 3, the image processing apparatus 300 may include a ray tracer 310 to perform ray tracing with respect to a plurality of first rays selected from among all rays to be used for photon mapping.

A sampling unit 330 may sample a ray space by obtaining a photon function using the plurality of selected first rays. The photon function will be described later.

A reconstructor 340 may reconstruct the sampled ray space to include pseudo rays, and provide pseudo photon information to a pseudo photon processor 350.

A result of calculating accurate photon information based on accurate rays actually provided by the ray tracer 310 may be transferred to a renderer 360 through a photon processor 320.

The renderer 360 may perform rendering using actual photons and pseudo photons to be used at a rendering point of view. In this process, a radiance estimator 370 may perform radiance calculation using photon mapping.

Operations of the ray tracer 310 through the reconstructor 340 may be the same as described with reference to FIGS. 1 and 2, and rendering and radiance estimation will be described in detail with reference to FIG. 8.

Figure 4:
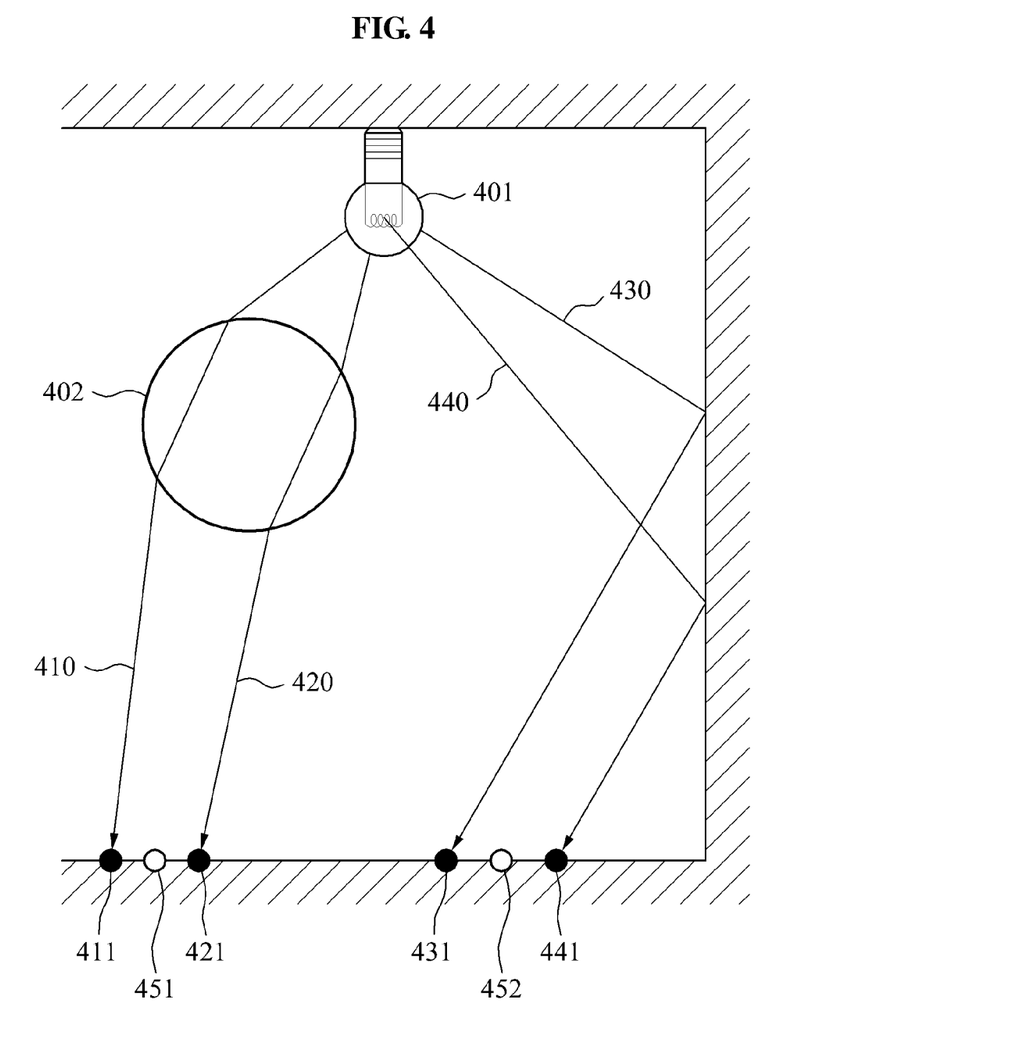
FIG. 4 illustrates a photon mapping process of an image processing apparatus according to example embodiments.

FIG. 4 illustrates a photon mapping process of an image processing apparatus according to example embodiments.

Referring to FIG. 4, a light source 401 may provide photons affecting radiances of 3D points 411, 421, and the like. The photons may be associated with rays 410 through 440, and the like emitted from the light source 401 for photon mapping.

In a conventional method, photons may be calculated based on a large number of all rays, for example, one hundred million rays, generated from the light source 401. For the photon calculation, the Monte Carlo technique, Russian roulette, and the like may be used.

The generated photons may be managed by a caustic map and a global photon map, through photon mapping.

In contrast, in the process according to example embodiments, the ray selector 210 of FIG. 2 may select first rays corresponding to a sub-quantity or portion of all rays, rather than selecting all rays, in view of any of a texture of a 3D object, a direction, an intensity, and a position of a light source.

A radiance may be estimated by performing ray tracing, for example, refraction, reflection, and the like, with respect to the selected rays 410, 420, 430, and 440, and providing photons to object points 411, 421, 431, and 441, respectively. In this example, some of the rays, for example, the rays 410 and 420, may pass through an object 402 to be refracted.

Accordingly, accurate photons may be associated with the points 411, 421, 431, and 441 for which actual photons are calculated.

For example, pseudo photons may be calculated for points 451 and 452, for which accurate photons have not been calculated. Accordingly, the pseudo photons for the points 451 and 452 may be obtained based on a result of calculating the actual photons for the points 411, 421, 431, and 441. Here, the calculation of the actual photons may require a large amount of operations.

Photon calculation, information to be stored, and the like will be described with reference to FIGS. 5 and 6.

Figure 5:
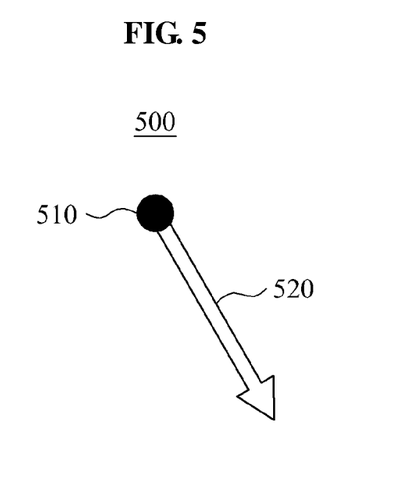
FIG. 5 illustrates photon information according to example embodiments.

FIG. 5 illustrates photon information 500 according to example embodiments.

According to the present embodiments, additional information may be processed and stored in a tracing process for photon calculation, when compared to a result of calculating photons using a conventional method.

A photon tracing function P may be defined for such processing. For example, the photon tracing function P may be defined, as expressed by Equation 1.

$$P(d,o)=p \qquad \text{[Equation 1]}$$

In Equation 1, an origin 510 denoting a position of a photon and a direction 520 may be stored and managed. As a result of the calculation, the photon tracing function P may indicate ray tracing and photon generating process information at a point of intersection. Such photons may be stored for use in a different data structure, when compared to the conventional method.

Figure 6:
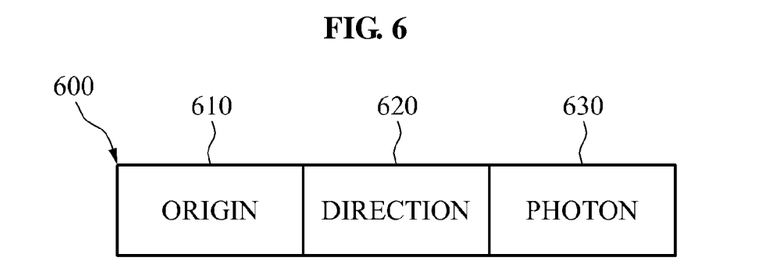
FIG. 6 illustrates a structure of photon storage data according to example embodiments.

FIG. 6 illustrates a structure 600 of photon storage data according to example embodiments.

Referring to FIG. 6, an individual photon represented by a photon function P may include an origin 610, a direction 620, and photon information 630. The photon information 630 may include information on a direction, a position, and an intensity of an object and/or a light source associated with the photon.

Such information may be construed as sample points constituting a virtual ray space.

Figure 7:
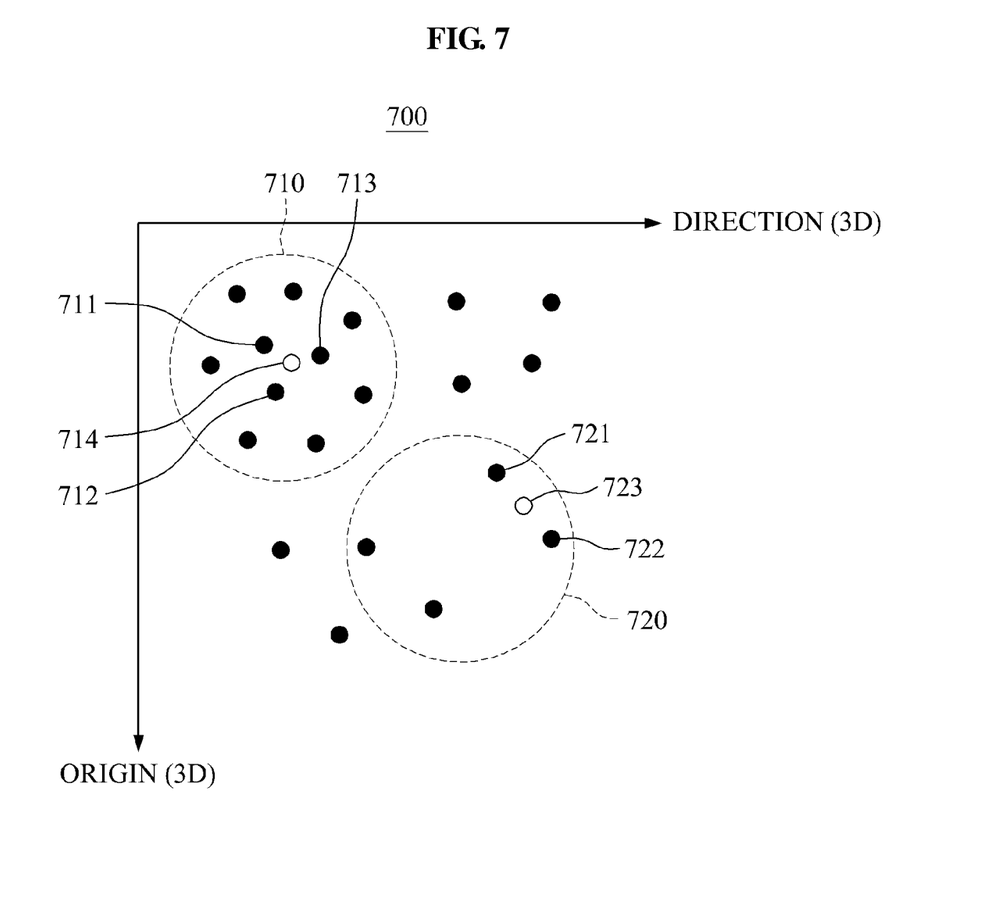
FIG. 7 illustrates ray space sampling and a photon function according to example embodiments.

FIG. 7 is a conceptual diagram 700 illustrating ray space sampling and a photon function according to example embodiments.

Referring to FIG. 7, black points 711, 712, 713, 721, 722, and the like may correspond to information calculated by calculating actual photons.

When such photon information is arranged based on an origin axis and a direction axis of each of the photons, a space including points shown in FIG. 7 may be construed as a virtual ray (or photon) space. Each of the origins and the directions may correspond to 3D information.

When photon information of the calculated points 711, 712, 713, 721, 722, and the like is regarded as sample points of the photon function P of Equation 1, information of white points 714, 723, and the like for which photon information has not actually been calculated may be calculated indirectly.

Accordingly, the photon function P(d, o) may be reconstructed by estimating the information on the points 714, 723, and the like.

For example, when pseudo photon information corresponding to the point 714 is queried, the pseudo photon information may be obtained by interpolating a ray corresponding to the query using N neighbor points. Here, N denotes a natural number.

In addition, a pseudo photon corresponding to the point 723 may be obtained using N nearest neighbor points, for example, two neighbor points 721 and 722. An exemplary process of performing interpolation using two neighbor points may be expressed by Equation 2.

$$\vec{P}(\vec{d}_k, o_k) \approx q_k = \frac{d_{n1}\vec{p}_{n0} + d_{n0}\vec{p}_{n1}}{d_1 + d_0} \qquad \text{[Equation 2]}$$

In Equation 2, $\vec{P}_{n0}$ and $\vec{P}_{n1}$ denote information on the point 721 and information on the point 722, respectively. $d_{n0}$ and $d_{n1}$ denote weights respectively applied to the information on the point 721 and the information on the point 722, and may be construed as L2 distances in a ray space.

Through the preceding, a pseudo photon q_k may be obtained.

In FIG. 7, the ray space includes an area 710 in which actually calculated photons are relatively concentrated, and an area 720 in which actually calculated photons are relatively less concentrated, because a relatively greater number of rays are selected in the area 710, and based on a degree of significance of rays to be actually calculated accurately, a relatively fewer number of rays are selected in the area 720.

Figure 8:
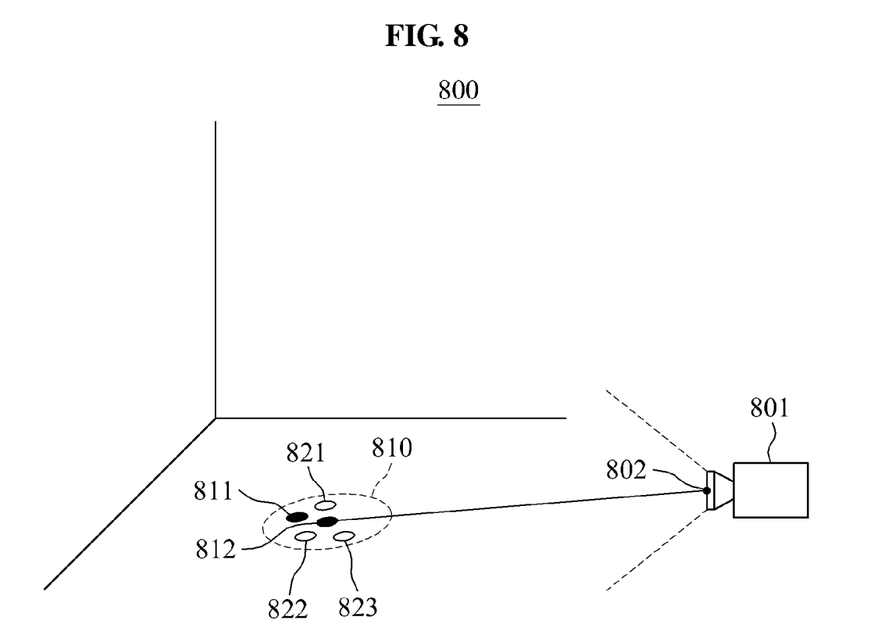
FIG. 8 illustrates a rendering process according to example embodiments.

FIG. 8 illustrates a rendering process according to example embodiments.

Referring to FIG. 8, a radiance of a point 812 may be calculated from a rendering point of view 802 of a camera 801 with respect to a 3D space 800.

The radiance of the point 812 may be calculated based on a weighted sum of radiances of neighbor points, as expressed by Equation 3.

$$L_r(x, \Psi_r) = \int_{all\ \Psi_i} f_r(x, \Psi_r, \Psi_i) L_i(x, \Psi_i) |\vec{n} \cdot \Psi_i| d\omega_i \quad \text{[Equation 3]}$$

When a portion of a flux within a radius r is considered, rather than the entire flux, the radiance of the point 812 may be approximated as expressed by Equation 4.

$$L_r(x, \Psi_r) \approx \frac{1}{\pi r^2} \sum_{p=1}^{N} f_r(x, \Psi_r, \Psi_{i,p}) \Delta \Phi_p(x, \Psi_{i,p}) \quad \text{[Equation 4]}$$

In this example, a point 811 in which an actual photon has been stored, and points 821, 822, and 823 for which pseudo photons are calculated may be considered. Here, the points 811, 821, 822, and 823 may be included in an area 810 within the radius r.

The pseudo photons may be obtained from the reconstructed ray space of FIG. 7 and thus, a real-time characteristic may be guaranteed.

Such calculation of pseudo photons may be derived by a process of providing a plurality of second rays by interpolating a plurality of first rays using a photon function P, as described above.

Figure 9:
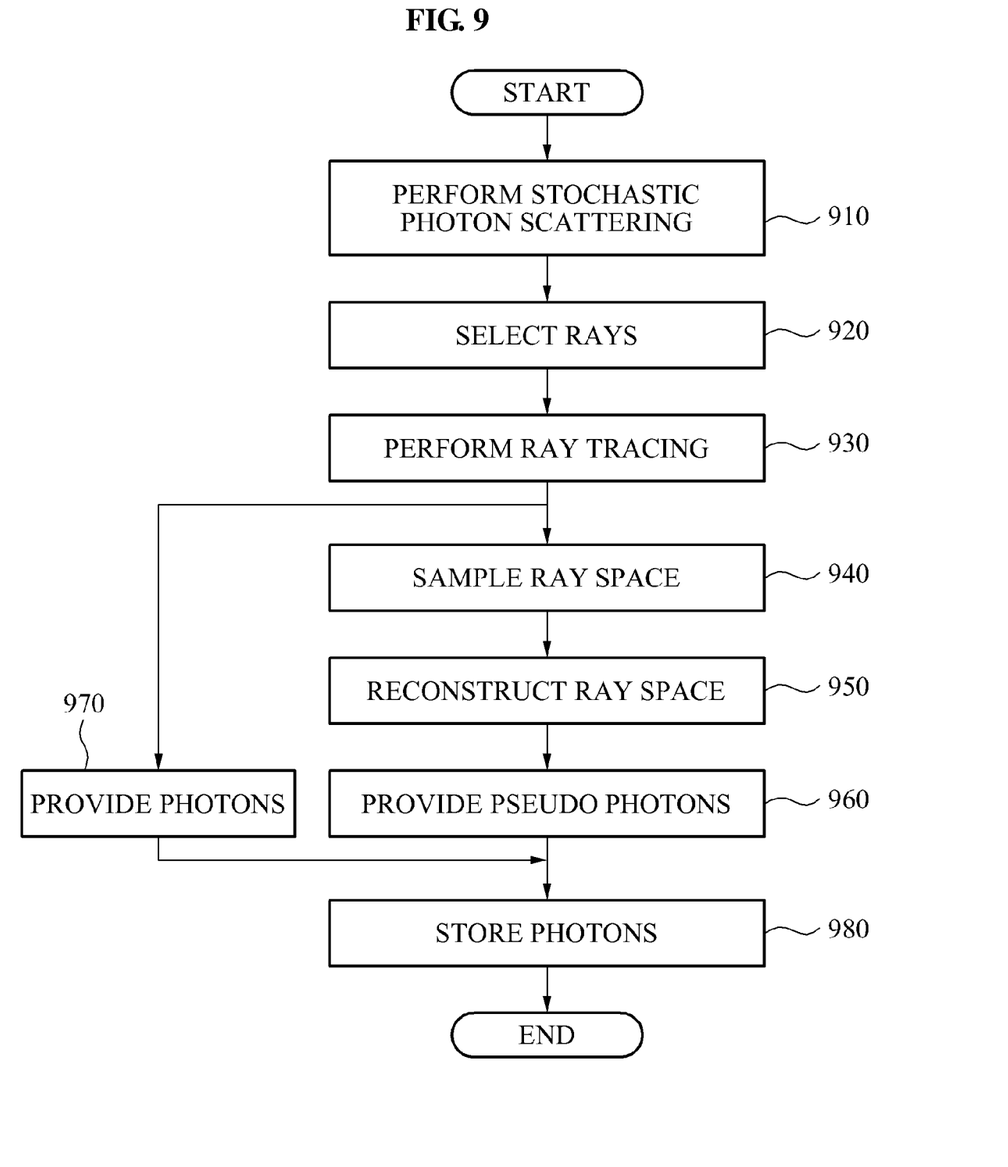
FIG. 9 illustrates an image processing method according to example embodiments.

FIG. 9 illustrates an image processing method according to example embodiments.

Referring to FIG. 9, when stochastic photon scattering is performed in operation 910, rays to be used for photon mapping may be identified. In operation 920, significant rays greatly affecting a rendering quality may be selected from among the identified rays, based on a direction, an intensity, a position of a light source, a texture of a 3D object, and the like.

The process of selecting the rays may be the same as described with reference to FIGS. 1 through 4.

In operation 930, ray tracing may be performed with respect to the selected rays, for example, first rays. In operation 940, a ray space may be sampled.

The ray space sampling process may be understood on a basis of the definition of the photon function P described using Equation 1, and operation 950 of reconstructing the sampled ray space using the definition of the function P.

In operation 970, actual photons to be calculated accurately may be provided through the ray tracing of operation 930. In operation 960, pseudo photons may be provided in the reconstructed ray space.

The descriptions provided with reference to FIGS. 4 through 7 may be applied to the actual photons and the pseudo photons.

In operation 980, the actual photons and the pseudo photons may be stored and managed. Photon information may be used for a future rendering process. In addition, additional photons to be used may be obtained in real time and thus, a quality of rendering may increase without affecting real-time performance.

The described hardware devices or apparatuses may be configured to act as one or more modules or units in order to perform the operations of the above-described embodiments. The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

The described methods may be executed on a general purpose computer or processor or may be executed on a particular machine such as the image processing apparatus described herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus comprising:
a ray tracer configured to perform ray tracing with respect to first rays, selected from among all rays, for photon mapping, wherein the ray-traced first rays are selected based on any two or more of a texture of a three-dimensional (3D) object associated with the photon mapping, a direction and an intensity of a lighting from a light source, and a position of the light source associated with the photon mapping;
a sampling processor configured to sample a ray space using the ray-traced first rays to obtain a photon function representing a ray space; and
a reconstructor configured to reconstruct the sampled ray space using the ray-traced first rays to provide a second ray to generate a pseudo photon.

2. The apparatus of claim 1, further comprising:
a ray selector to select the ray-traced first rays based on any two or more of the texture of the 3D object associated with the photon mapping, the direction and the intensity of the lighting from the light source, and the position of the light source associated with the photon mapping.

3. The apparatus of claim 2, wherein the ray selector selects the ray-traced first rays using stochastic probability photon scattering.

4. The apparatus of claim 1, further comprising:
a photon processor to generate photons associated with the ray-traced first rays.

5. The apparatus of claim 1, further comprising:
a pseudo photon processor to generate at least one pseudo photon using the second ray.

6. The apparatus of claim 5, further comprising:
a renderer to render a point using a first pseudo photon associated with the point corresponding to a rendering point of view, from among the pseudo photon.

7. The apparatus of claim 6, further comprising:
a radiance estimator configured to estimate a radiance of the point using the first pseudo photon.

8. The apparatus of claim 1, wherein the sampling unit samples the ray space using a photon function determined by arranging directions and positions of the ray-traced first rays three-dimensionally.

9. The apparatus of claim 8, wherein the reconstructor provides the second ray by interpolating the ray-traced first rays using the photon function.

10. An image processing method comprising:
performing ray tracing, by way of a processor, with respect to first rays, selected from among all rays, for photon mapping, wherein the ray-traced first rays are selected based on any two or more of a texture of a three-dimensional (3D) object associated with the photon mapping, a direction and an intensity of a lighting from a light source, and a position of the light source associated with the photon mapping;
sampling a ray space using the ray-traced first rays to obtain a photon function representing a ray space; and
reconstructing the sampled ray space using the ray-traced first rays to provide a second ray to generate a pseudo photon.

11. The method of claim 10, further comprising:
selecting the ray-traced first rays based on any two or more of the texture of the 3D object associated with the photon mapping, the direction and the intensity of the lighting from the light source, and the position of the light source associated with the photon mapping.

12. The method of claim 10, further comprising:
generating photons associated with the ray-traced first rays; and
generating a pseudo photon using the second ray.

13. The method of claim 12, further comprising:
rendering a point using photons associated with the point corresponding to a rendering point of view, among the photons associated with the ray-traced first rays and the pseudo photon.

14. The method of claim 13, further comprising:
estimating a radiance of the point using the photons associated with the point.

15. The method of claim 10, wherein the sampling comprises sampling the ray space using a photon function determined by arranging directions and positions of the ray-traced first rays three-dimensionally.

16. The method of claim 15, wherein the reconstructing comprises providing the second ray by interpolating the ray-traced first rays using the photon function.

17. A non-transitory computer-readable medium comprising a program for instructing a computer to perform an image processing method, wherein the method comprises:
performing ray tracing, by way of a processor, with respect to first rays, selected from among all rays, for photon mapping, wherein the ray-traced first rays are selected based on any two or more of a texture of a three-dimensional (3D) object associated with the photon mapping, a direction and an intensity of a lighting from a light source, and a position of the light source associated with the photon mapping;
sampling a ray space using the ray-traced first rays to obtain a photon function representing a ray space; and
reconstructing the sampled ray space using the ray-traced first rays to provide a second ray to generate a pseudo photon.

18. An image processing apparatus comprising:
a ray tracer configured to perform ray tracing with respect to first rays selected from among all rays for photon mapping, wherein the ray-traced first rays are selected based on any two or more of a texture of a three-dimensional (3D) object associated with the photon mapping, a direction and an intensity of a lighting from a light source, and a position of the light source associated with the photon mapping;
a sampling processor configured to sample a ray space using the ray-traced first rays to obtain a photon function representing a ray space; and
a reconstructor configured to reconstruct the sampled ray space using the ray-traced first rays by providing a second ray that is not actually traced.

19. The apparatus of claim 18, further comprising:
a pseudo photon processor configured to generate a pseudo photon using the second ray; and
a renderer configured to render a point using a first pseudo photon associated with the point corresponding to a rendering point of view, from among the pseudo photon.

20. An image processing method comprising:
performing ray tracing, by way of a processor, on a first sub-quantity of rays selected from rays to be used for photon mapping, wherein the first sub-quantity of rays are selected based on any two or more of a texture of a three-dimensional (3D) object associated with the photon mapping, a direction and an intensity of a lighting from a light source, and a position of the light source associated with the photon mapping;
sampling a ray space using the ray-traced first sub-quantity of rays; and reconstructing the sampled ray space using the traced first sub-quantity of rays by calculating a second sub-quantity of rays, without ray-tracing the second sub-quantity of rays.

* * * * *